(12) United States Patent
Kamekawa

(10) Patent No.: US 9,164,991 B2
(45) Date of Patent: Oct. 20, 2015

(54) DOCUMENT MANAGEMENT SYSTEM AND METHOD THEREOF

(71) Applicant: CANON KABUSHIKI KAISHA, Tokyo (JP)

(72) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 13/759,548

(22) Filed: Feb. 5, 2013

(65) Prior Publication Data

US 2013/0204890 A1 Aug. 8, 2013

(30) Foreign Application Priority Data

Feb. 8, 2012 (JP) .................................. 2012-025334

(51) Int. Cl.
*G06F 17/30* (2006.01)
(52) U.S. Cl.
CPC ................................ *G06F 17/30011* (2013.01)
(58) Field of Classification Search
CPC .................................................. G06F 17/30967
USPC ........................................................... 707/772
See application file for complete search history.

(56) References Cited

U.S. PATENT DOCUMENTS 5,619,688 A * 4/1997 Bosworth et al. ...................... 1/1
2007/0192304 A1* 8/2007 Iyer et al. ........................... 707/4

FOREIGN PATENT DOCUMENTS

JP 2010-097296 A 4/2010

* cited by examiner

*Primary Examiner* — William Spieler
(74) *Attorney, Agent, or Firm* — Canon USA, Inc., IP Division

(57) ABSTRACT

A document management system that defines an index type for each management unit for managing a plurality of documents, individually selects a search area and an index acquisition area, from which the index type is acquired, displays in a list the index types defined for the management unit in a selected index acquisition area, makes a user select a desired index type from among the index types displayed in a list, sets a search condition using the selected index type, and searches for a document corresponding to the search condition from among a plurality of documents managed by the management unit belonging to the search area.

12 Claims, 17 Drawing Sheets

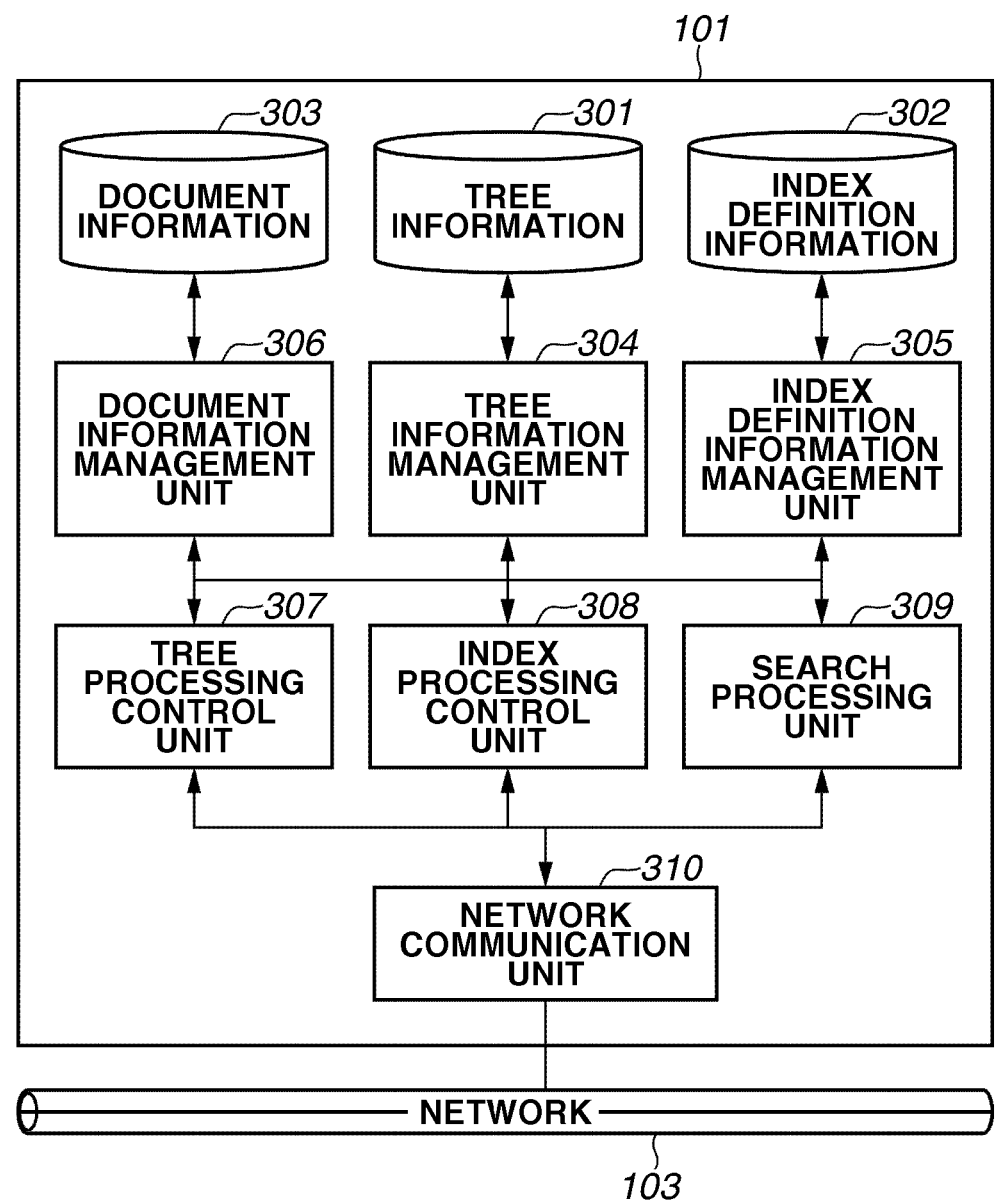

FIG.4A
EXAMPLE OF TREE INFORMATION 301

| HIERARCHY ID | HIERARCHY NAME | UPPER LEVEL ID | TYPE |
|---|---|---|---|
| L001 | SALES DEPARTMENT SITE | — | SITE |
| L002 | SALES DIVISION 1 | L001 | SITE |
| L003 | SALES DIVISION 2 | L001 | SITE |
| L004 | MANAGEMENT DIVISION | L001 | SITE |
| L005 | PRODUCT MANAGEMENT | L002 | LIBRARY |
| L006 | ORDER MANAGEMENT | L002 | LIBRARY |
| L007 | CLIENT MANAGEMENT | L002 | LIBRARY |
| L008 | PRODUCT MANAGEMENT | L003 | LIBRARY |
| L009 | ORDER MANAGEMENT | L003 | LIBRARY |
| L010 | CLIENT MANAGEMENT | L003 | LIBRARY |
| L011 | BUDGET MANAGEMENT | L004 | LIBRARY |
| L012 | PERFORMANCE MANAGEMENT | L004 | LIBRARY |
| L013 | ORDER TALLY | L004 | LIBRARY |

FIG.4B
DISPLAY EXAMPLE OF TREE INFORMATION

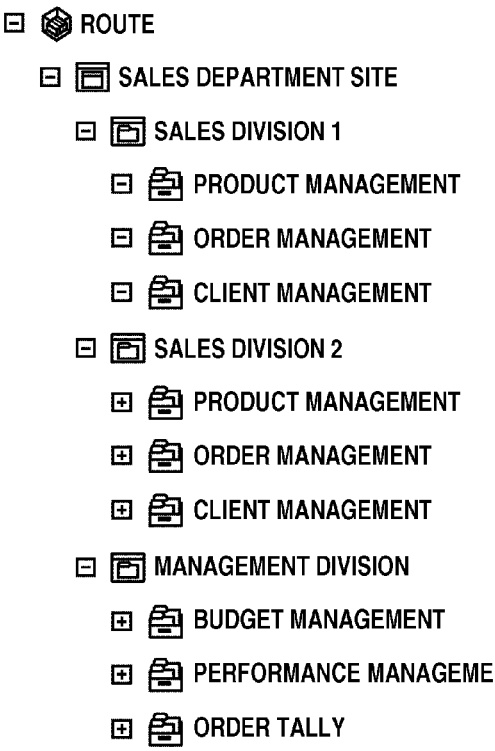

FIG.5

EXAMPLE OF INDEX DEFINITION INFORMATION 302

| INDEX DEFINITION ID | INDEX DEFINITION NAME | TYPE | LIBRARY ID |
|---|---|---|---|
| IDX001 | PRODUCT NUMBER | TEXT | L005 |
| IDX002 | PRODUCT NAME | TEXT | L005 |
| IDX003 | ORDER NUMBER | TEXT | L006 |
| IDX004 | ORDER DATE | DATETIME | L006 |
| IDX005 | DELIVERY DATE | DATETIME | L006 |
| IDX006 | CLIENT NUMBER | TEXT | L006 |
| IDX007 | CLERK | TEXT | L006 |
| IDX008 | CLIENT NUMBER | TEXT | L007 |
| IDX009 | CLIENT NAME | TEXT | L007 |
| IDX010 | CLERK | TEXT | L007 |
| IDX011 | PRODUCT NUMBER | TEXT | L008 |
| IDX012 | PRODUCT NAME | TEXT | L008 |
| IDX013 | ORDER NUMBER | TEXT | L006 |
| IDX014 | ORDER DATE | DATETIME | L006 |
| IDX015 | DELIVERY DATE | DATETIME | L006 |
| IDX016 | CLIENT NUMBER | TEXT | L006 |
| IDX017 | CLERK | TEXT | L006 |
| IDX018 | CLIENT NUMBER | TEXT | L007 |
| IDX019 | CLIENT NAME | TEXT | L007 |
| IDX020 | CLERK | TEXT | L007 |

FIG.6A
EXAMPLE OF FILE INFORMATION

| DOCUMENT ID /431 | DOCUMENT NAME /432 | FILE /433 | LIBRARY ID /434 |
|---|---|---|---|
| D001 | PRODUCT01SPEC.pdf | (SUBSTANCE) | L005 |
| D002 | ORDER00001.pdf | (SUBSTANCE) | L006 |
| D003 | ORDER00003.pdf | (SUBSTANCE) | L006 |
| D004 | CLIENT00001.xls | (SUBSTANCE) | L007 |
| D005 | PRODUCT02SPEC.pdf | (SUBSTANCE) | L008 |
| D006 | ORDER00002.pdf | (SUBSTANCE) | L009 |
| D007 | ORDER00004.pdf | (SUBSTANCE) | L009 |
| D008 | CLIENT00002.xls | (SUBSTANCE) | L010 |

FIG.6B
EXAMPLE OF INDEX VALUE INFORMATION

| DOCUMENT ID /441 | INDEX DEFINITION ID /442 | INDEX VALUE /443 |
|---|---|---|
| D001 | IDX001 | P-2011-00001 |
| D001 | IDX002 | PRODUCT01 |
| D002 | IDX003 | O-2011-00001 |
| D002 | IDX004 | 2011/01/10 |
| D002 | IDX005 | 2011/01/41 |
| D002 | IDX006 | C001 |
| D002 | IDX007 | SUZUKI |
| D003 | IDX003 | O-2011-00003 |
| D003 | IDX004 | 2011/03/01 |
| D003 | IDX005 | 2011/03/20 |
| D003 | IDX006 | C001 |
| D003 | IDX007 | SUZUKI |
| D004 | IDX008 | C001 |
| D004 | IDX009 | DAIICHI Co.,Ltd |
| D004 | IDX010 | SUZUKI |
| D005 | IDX011 | P-2011-00002 |
| D005 | IDX012 | PRODUCT02 |
| D006 | IDX013 | O-2011-00002 |
| D006 | IDX014 | 2011/02/10 |
| D006 | IDX015 | 2011/03/03 |
| D006 | IDX016 | C002 |
| D006 | IDX017 | TANAKA |
| D007 | IDX013 | O-2011-00004 |
| D007 | IDX014 | 2011/04/01 |
| D007 | IDX015 | 2011/04/24 |
| D007 | IDX016 | C002 |
| D007 | IDX017 | TANAKA |
| D008 | IDX018 | C002 |
| D008 | IDX019 | DAINI Co.,Ltd |
| D008 | IDX020 | TANAKA |

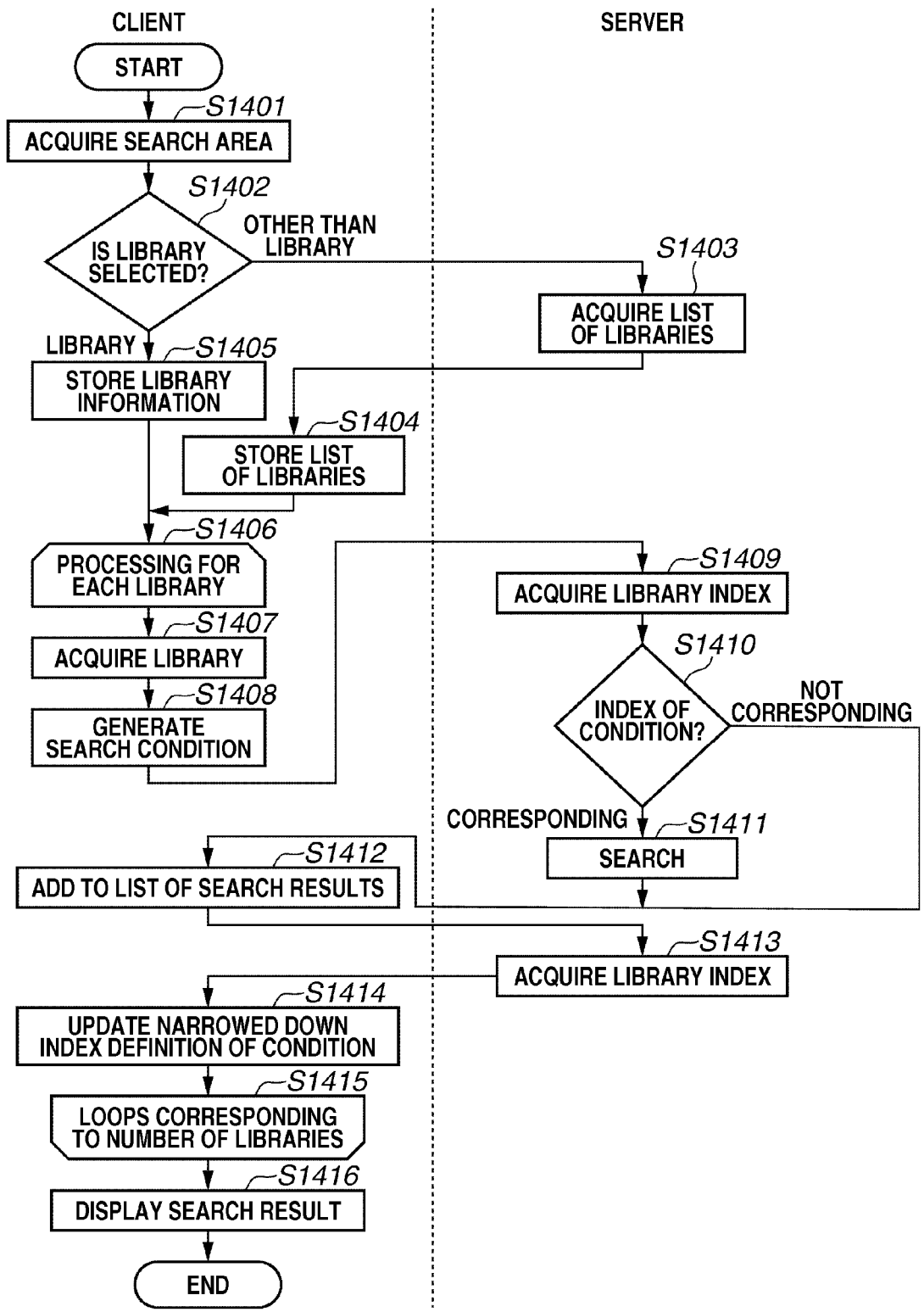

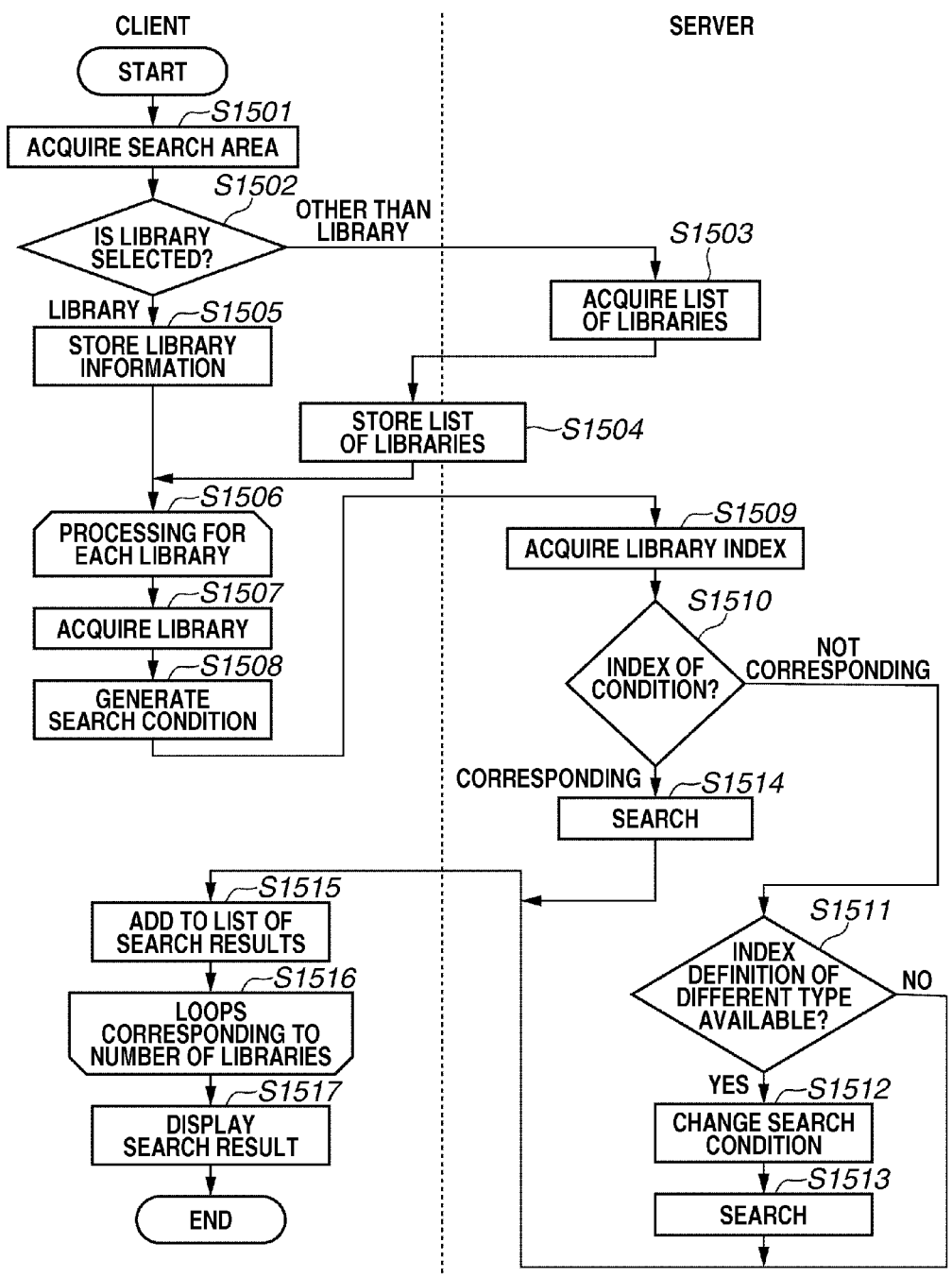

DOCUMENT MANAGEMENT SYSTEM AND METHOD THEREOF

BACKGROUND OF THE INVENTION

1. Field of the Invention

The present invention relates to a document management system, in which a document management server searches a document using index information.

2. Description of the Related Art

In a document management system for managing documents by associating the documents with index information, index search is generally used for searching the document including the index information corresponding to a keyword specified by a user. The index information includes a plurality of types of index definitions (also referred to as "index types", "item names" or "attribute names") and a value of each index definition (also referred to as an "index value" or "attribute value") given to each document. The index definition (type, item name, and attribute name) generally defines the index type necessary for each document management unit (e.g., for each database or each management hierarchy) instead of using the same definition for the entire document management system (all database).

However, the management becomes too complicated if the index is freely defined for various kinds of hierarchy. Thus, in some systems, the hierarchy is provided in which the index can be defined, and the index can be defined for each management unit in the hierarchy. When the index is searched in such a document management system, the management unit is specified as a search target, the user specifies a search condition (index definition and search keyword), and then the search is performed based on the specified search condition.

Further, in Japanese Patent Application Laid-Open No. 2010-097296, in step S401, when specification of a search target area where a document file is searched is received, in steps S402 and 403, a file name, position information, and a plurality of attribute names and attribute values of the document file included in the specified search target area are acquired and stored.

When an input of a search word (search keyword) is received in step S404, then in step S405, a plurality of attribute values corresponding to the search word are extracted from among the stored attribute values. In step S406, a plurality of attribute names corresponding to the plurality of extracted attribute values are acquired, and in step S407, the acquired attribute names are displayed in a list. When, in step S408, the attribute name desired by the user is selected from the displayed list, in step S409, a document file including the selected attribute name and the search word is extracted.

In steps S402 and S403 of Japanese Patent Application Laid-Open No. 2010-097296, since the file name, the position information, and the plurality of attribute names and attribute values need to be acquired for all the document files included in the search target area, if the search target area is set in a wide area, processing for acquiring the information takes time.

Further, in the system in which the index type can be defined for each document management unit, when the plurality of document management units are set as the search target area, the processing for acquiring the information about the index definition (information about the index type) alone takes much time. For example, if the management units in which ten index types are defined include ten kinds of hierarchy, when acquiring the information about the index definition from each hierarchy (each management unit) takes 0.5 seconds, then acquiring index definition information from ten kinds of hierarchy takes 5 seconds.

Thus, in such a system where the user inputs the desired index definition and the search keyword after the information about the index definition is acquired, the user needs to wait a while until the system acquires the information about all the index definitions.

SUMMARY OF THE INVENTION

A document management system that defines an index type for each management unit that is a unit for managing a plurality of documents, includes a search area selection unit configured to select one or a plurality of management units as a search area, an index acquisition area selection unit configured to select one or the plurality of management units, from which the index type is acquired, as an index acquisition area, a search condition setting unit configured to display in a list the index types defined for the management unit in the index acquisition area selected by the index acquisition area selection unit, make a user select a desired index type from among the types of the indexes displayed in a list, and set a search condition using the selected index type, and a search unit configured to search for a document corresponding to the search condition set by the search condition setting unit from among a plurality of documents managed by the management unit belonging to the search area selected by the search area selection unit.

According to the present invention, since the search area and the index acquisition area, from which the index type is acquired, can be individually selected, the index type can be acquired under no influence of a size of the search area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a software configuration of the document management server.

FIGS. 4A and 4B illustrate data configurations of tree information.

FIG. 5 illustrates data configuration of index definition information.

FIGS. 6A and 6B illustrate data configurations of document information (file information and index value information).

FIG. 16 is a flowchart illustrating a flow of the search processing according to the second exemplary embodiment.

FIG. 17 is a flowchart illustrating a flow of search processing according to a third exemplary embodiment.

DESCRIPTION OF THE EMBODIMENTS

Various exemplary embodiments, features, and aspects of the invention will be described in detail below with reference to the drawings.

Figure 1:
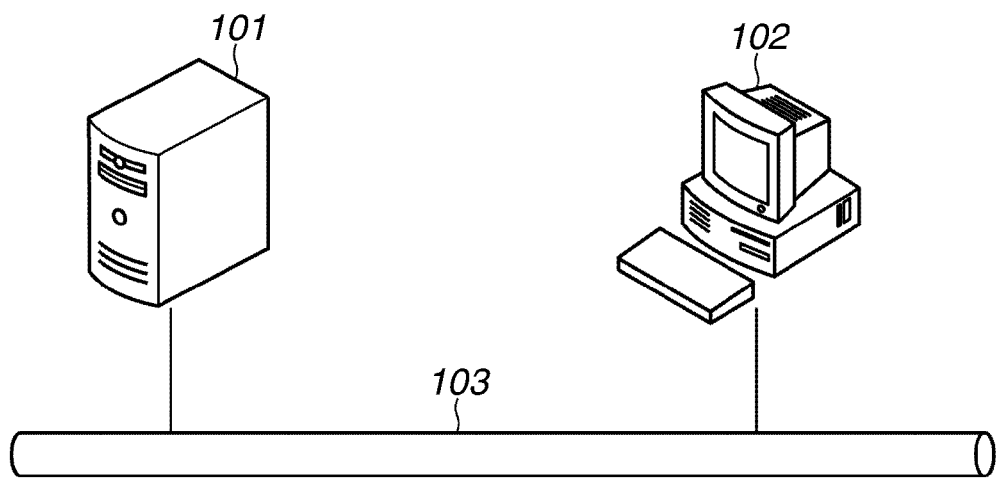
FIG. 1 illustrates a system configuration.

FIG. 1 illustrates a configuration of a document management system according to an exemplary embodiment of the present invention. In the system, a document management server 101 and a client 102 are connected with each other via a network such as a local area network (LAN) 103.

The document management server 101 provides a document management function of managing contents such as a document and an image file, a search function for the managed document, and an application server function. The client 102 is connected to the document management server 101 via a document management application to provide a function of operating the content.

Figure 2:
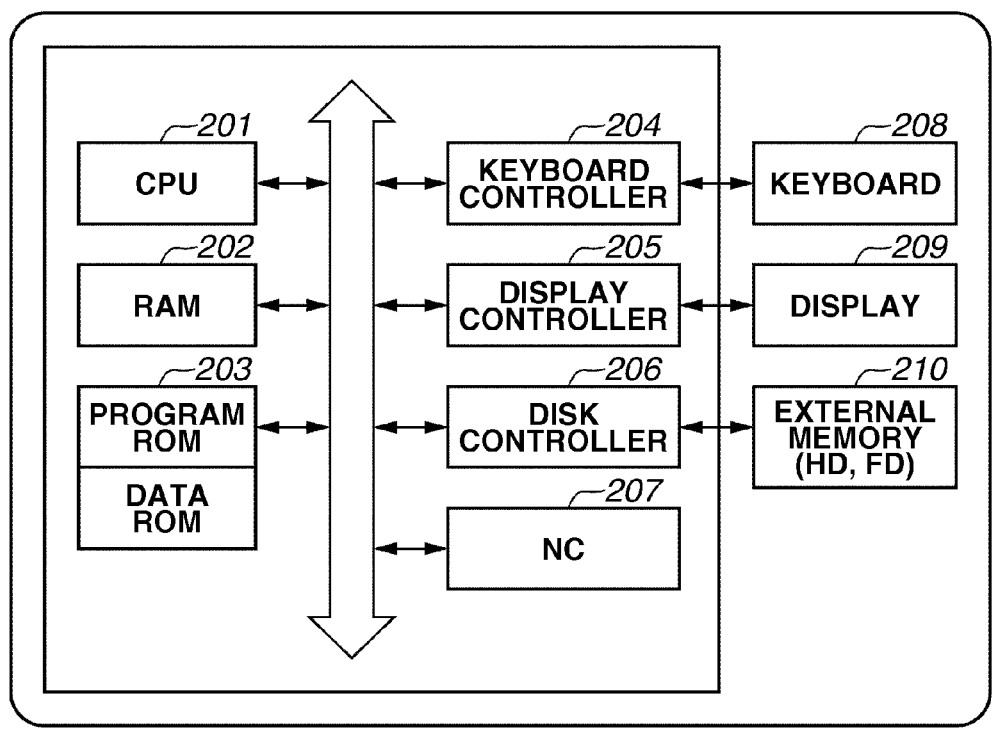
FIG. 2 illustrates a hardware configuration of a document management server and a client.

The document management server 101 and the client 102 can be formed of hardware of a general information processing apparatus (personal computer (PC)). FIG. 2 illustrates a hardware configuration of each PC forming a document management system according to the present exemplary embodiment. As illustrated in FIG. 2, a central processing unit (CPU) 201 executes a program stored in a read only memory (ROM) in a ROM 203, and a program such as an operation system (OS) and an application that are loaded from a external memory 210 to a random access memory (RAM) 202. In other words, the CPU of the computer executes a computer program stored in a computer readable storage medium to function as a processing unit performing the processing of each flowchart described below.

The RAM 202 is a main memory of the CPU 201 and functions as a work area. A keyboard controller 204 controls an operation input via a keyboard 208 and pointing devices (mouse, touch pad, touch panel, and track ball) (not illustrated). A display controller 205 controls a display 209. A disk controller 206 controls access to data stored in an external memory 210 such as a hard disk (HD) and a flexible disk (FD) storing various types of data. A network controller (NC) 207 is connected to a network to perform communication control with another device connected thereto.

A configuration of the system and a flow of processing according to a first exemplary embodiment of the present invention will be described below.

<Configuration of Document Management Server>

FIG. 3 illustrates a configuration example of each processing unit provided by the document management server 101 in the document management system according to the first exemplary embodiment of the present invention. The CPU 201 of the document management server 101 executes the program to function as each processing unit 304 to 310.

Information 301 to 303 about the contents or the index is retained in the external memory 210, and the information is loaded to the RAM. 202 of the document management server 101 to be used for the processing as necessary. The information 301 to 303 may be managed by a database (DB) or a file, and no particular form of information is required.

The tree information 301 represents logical hierarchy information of the document management server 101 and is provided to each processing unit via a tree information management unit 304. The tree information 301 includes items indicated by a hierarchy ID 411, a hierarchy name 412, an upper hierarchy ID 413, and a type 414 illustrated in FIG. 4A. The hierarchy ID 411 is ID information for uniquely identifying each hierarchy (identifier information of the hierarchy) of the document management server 101. The hierarchy name 412 is information indicating a name of each hierarchy used when the tree information 301 is displayed on a screen. An upper hierarchy ID 413 is information indicating the upper hierarchy ID of each hierarchy ID 411, and defining a parent-child relationship in a hierarchy structure. However, since a hierarchy 415 of the uppermost class does not have the upper hierarchy ID than that class, it has no information about the upper hierarchy ID 413.

The type 414 indicates the type of each hierarchy. According to an example illustrated in FIG. 4A, a "library" that is a unit of document management and a "site" used for classifying the libraries depending on its usage are included. The site can include a plurality of hierarchy and more finely classify the library using the hierarchy structure. The index type (name) can be defined for each library that is the unit of the document management and the document file can be stored in the library. Further, each user can be given an access right to each library, and operate the document according to the access right given as to each library. The tree information 301 illustrated in FIG. 4A is displayed in a form of the hierarchy 401 illustrated in FIG. 4B.

According to the present exemplary embodiment, the document is stored right below the library, however a folder may be stored right below the library and, further, the document may be stored in the folder to classify and store the document using the folder.

Index definition information 302 indicates the index type (name and type of the index) defined for the hierarchy in which the type 414 is the "library", and is provided for each processing unit via an index definition information management unit 305. The index definition information 302 includes items 421 to 424 illustrated in FIG. 5.

Index definition ID 421 is the ID information (index identifier information) for uniquely identifying the index definition information defined for the library. An index definition name 422 indicates an index name (item name) and is displayed on the screen when the index is searched and browsed. A type 423 indicates a data type represented by each index definition and, according to the present exemplary embodiment, the data type is classified depending on "text" and "date and time". However, the present invention is not limited to providing other types than the types described above.

A library ID 424 is the hierarchy ID for specifying the library associated with each index definition information, and any one of the hierarchy IDs 411 illustrated in FIG. 4A in which type 414 is the library, is specified. According to the present exemplary embodiment, since the index is defined for each library, even if the libraries have same index definition name 422, the index is registered as another definition information for each associated library.

The document information 303 associates the "file information" specifying each document (file) stored in each library of the document management server 101 with the "index value information" specifying the index value given to each document. The document information 303 is provided to each processing unit via the document information management unit 306.

The file information includes items 431 to 434 illustrated in FIG. 6A. A document ID 431 is the ID information (file identifier information) for uniquely identifying each document (each file) stored in each library of the document management server. A document name 432 is information indicating a document (file) name of the document ID 431. A file 433 stores a substance of the file indicated by the document ID 431. The file 433 may not be the data of the substance itself but may be path information indicating a physical position where the substance is located. A library ID 434 is the hierarchy ID information about the library storing the document (file) indicated by the document ID 431. In other words, each document belongs to any one of the libraries in the logical hierarchy structure illustrated in FIG. 4A.

The index value information includes items 441 to 443 illustrated in FIG. 6B. The document ID 441 is the ID information for identifying the document associated with each index value, and any one of the document IDs 431 illustrated in FIG. 6A is specified. For the index definition ID 442, any one of the index definition IDs 421 illustrated in FIG. 5 is specified to indicate an index definition (index type (item name)) which each index value corresponds to. An index value 443 is information indicating the index value associated with each document. The index value 443 may be described in a format (e.g., date) predetermined depending on the type of each index definition defined by the type 423.

A tree processing control unit 307 has a function of providing information using the tree information 301 in response to a processing request from a client. According to the present exemplary embodiment, the specified tree hierarchy information and information about a list of lower kinds of hierarchy than the specified hierarchy are provided.

An index processing control unit 308 provides the index definition information and the index value information given to the document in response to the processing request from the client. The index processing control unit 308 provides the information when a search processing unit 309 performs search. For example, the index processing control unit 308 extracts and provides the index definition information about the specified library.

The search processing unit 309 has a function of providing the document information about a search processing result in response to the search processing request from the client. According to the present exemplary embodiment, the search processing unit 309 provides a list of the documents of the search result using the tree processing control unit 307, the index processing control unit 308, and the document information management unit 306.

A network communication unit 310 serves as the network controller (NC) 207 of the document management server 101 and is connected with the network 103. The processing request from a client 102 is received by the network communication unit 310 via the network, and then transferred to each processing unit described above.

<Configuration of Client>

Figure 7:
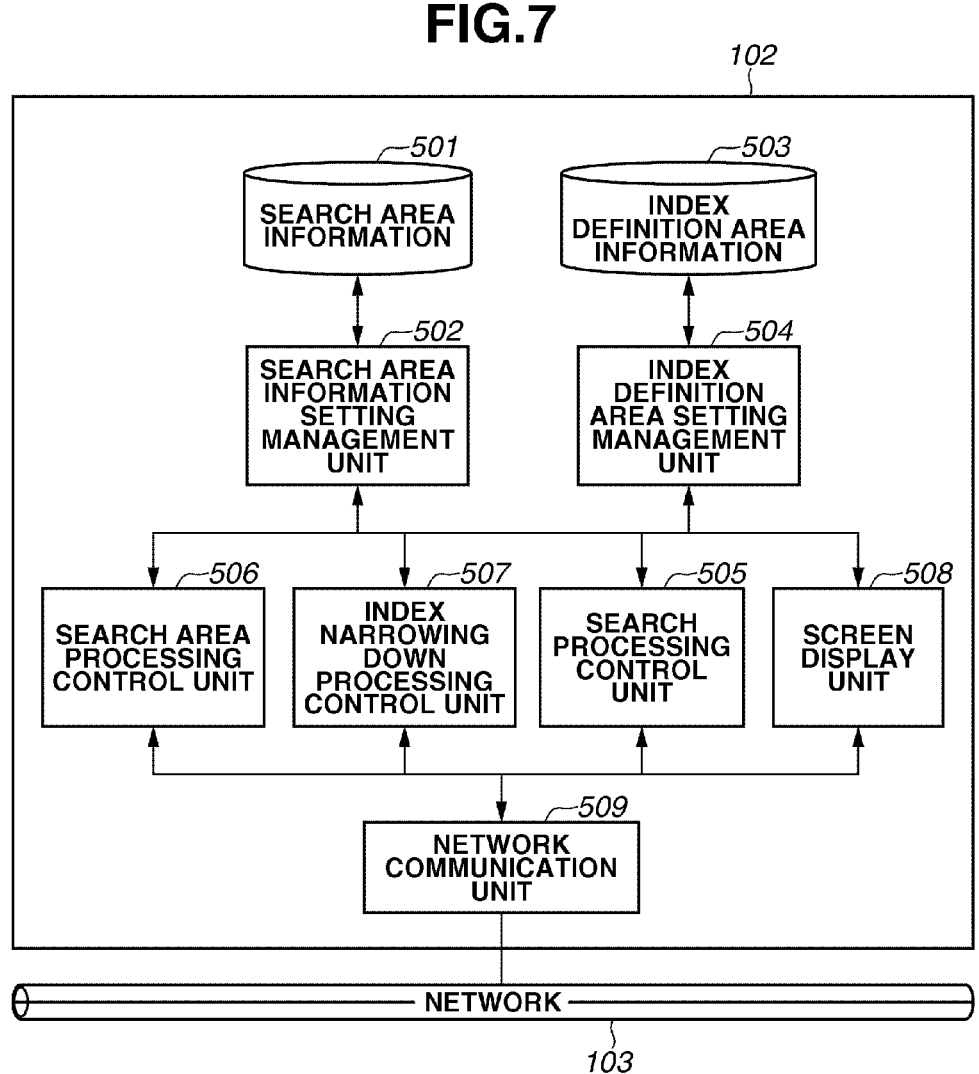
FIG. 7 illustrates a software configuration of the client.

FIG. 7 illustrates a configuration example of each processing unit of the client 102 in the document management system according to a first exemplary embodiment. When the CPU 201 of the client 102 executes the program, the client 102 functions as each processing unit 502 and 504 to 509.

Search area information 501 and index definition area information 503 are retained in the external memory 210, and loaded in the RAM 202 of the client 102 to be used in the processing as necessary. Such information may also be managed with the DB or the file, and its form is not particularly specified.

The search area information 501 is an information region for retaining information about the library and the site set as the search area by a user's operation via client 102. The search area information 501 stores information about the hierarchy selected by the user, among the information about each hierarchy included in the tree information 301 illustrated in FIG. 4A. The search area information 501 is provided to each processing unit via the search area information management unit 502.

As a target for acquiring information about the index definition (index type (item name)) used when a search condition is specified, the index definition area information 503 indicates an information region in which information for specifying the hierarchy (library) set by the user's operation via the client 102 is stored. The index definition area information 503 stores the information about the hierarchy selected by the user, among the information about each hierarchy included in the tree information 301 illustrated in FIG. 4A. The index definition area information 503 is provided to each processing unit via the index definition area information management unit 504.

Figure 8:
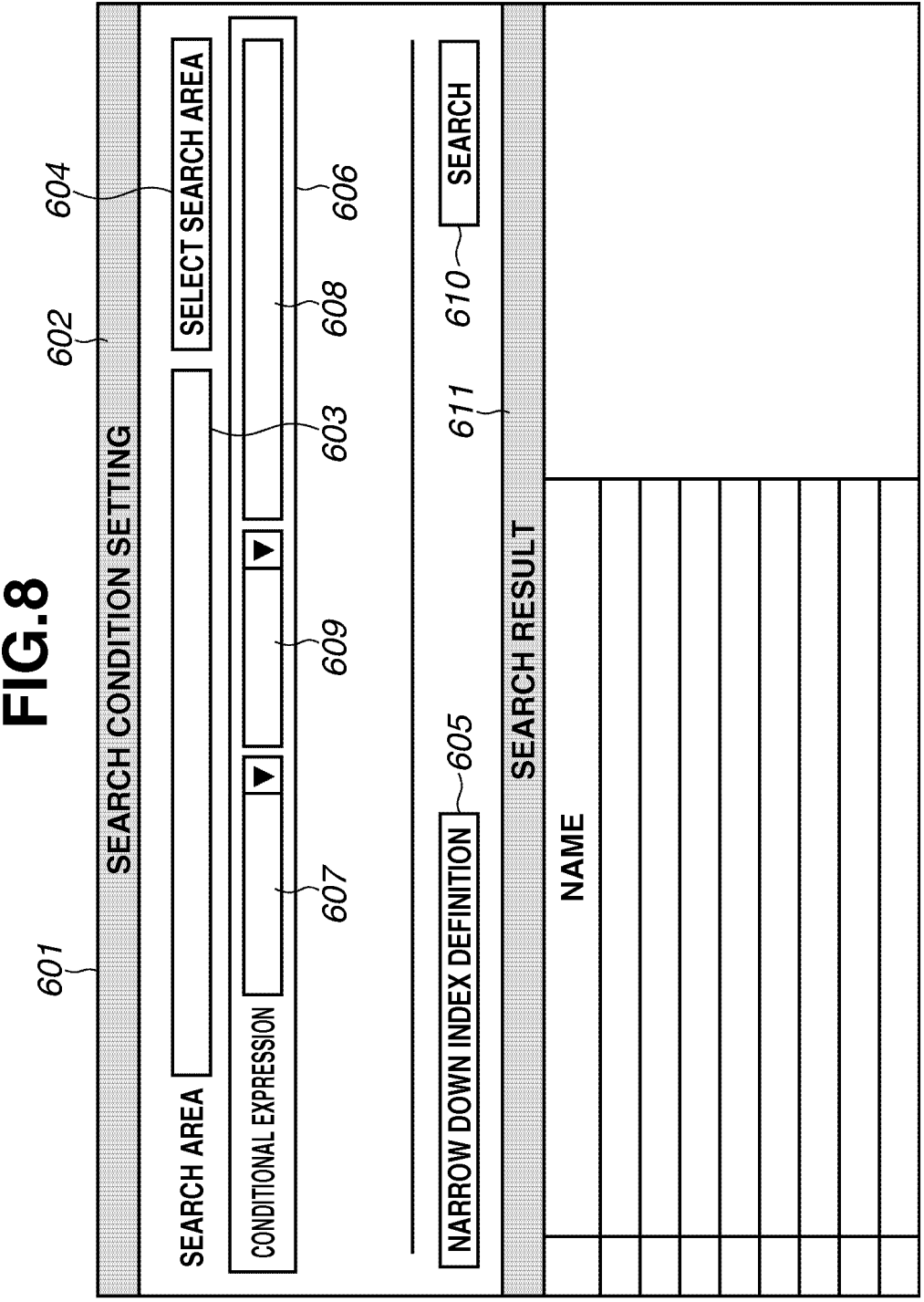
FIG. 8 is a screen for performing search processing.

A search processing control unit 505 controls a main screen of the client 102 and provides internal processing for the control when the search processing is performed. A search processing screen 601 for performing the search includes components 602 to 611 as illustrated in FIG. 8. The search processing screen 601 is broadly divided into the search condition setting area 602 and the search result display area 611.

The search condition setting area 602 includes the search area 603, the search area selection button 604, the button for selecting the index definition narrowing down area 605, the conditional expression setting area 606, and the search execution button 610. The search area 603 displays the search area specified by the user. When the search execution button 610 is pressed, the displayed hierarchy at the time and hierarchies below are determined as a search target area. When the search area selection button 604 is pressed by the user, a search area setting screen 701 in FIG. 9 described below is displayed.

Further, when the button for selecting the index definition narrowing down area 605 is pressed by the user, a screen 801 for setting an index definition narrowing down area in FIG. 10 described below is displayed. The conditional expression setting area 606 is an area where the search condition is set using the index definition (index type) set to the hierarchy specified on the screen 801 for setting the index definition narrowing down area and hierarchies below.

The conditional expression setting area 606 includes the index definition list 607, the condition value 608, and the condition operator 609. The index definition list 607 is a pull down list for displaying a list of the index definitions (index types) set to the library in an area (index acquisition area) specified on the screen 801 for setting the index definition narrowing down area. The index definition list 607 is used to make the user select a desired index definition to be specified as the search condition.

The condition value 608 is an input area for making the user input the index value as the search condition, and the user can specify an arbitrary character string. According to the present exemplary embodiment, the condition value 608 is defined as a simple input area, however, the condition value 608 of the present invention is not limited to the simple input area. An input format and an input style may be changed depending on the type of the index definition specified in the index definition list 607.

A condition operator 609 associates the index definition selected in the index definition list 607 with a condition value input in the condition value 608. For example, the condition operator 609 has options such as "equal", "not equal", "older", and "newer". The options displayed in the condition operator 609 are not limited to the above-described operations, but expression and content in the condition operator 609 may be changed for each index type definition.

As described above, according to the condition specified in the conditional expression setting area 606 (each of the index definition list 607, the condition value 608, and the condition operator 609), the search condition is set.

When the search execution button 610 is pressed, the search processing of the document is performed that corresponds to the area/condition specified in the search area 603 and the conditional expression setting area 606 described above, and the search result is displayed in the search result display area 611.

The search result display area 611 displays the document information corresponding to the search condition in a list so that a plurality of documents can be displayed in a list format. According to the present exemplary embodiment, only the document name corresponding to the search result is displayed, however, the present invention is not limited to displaying the document names described above, but may display the index value associated with each document and other information in the list together.

Figure 9:
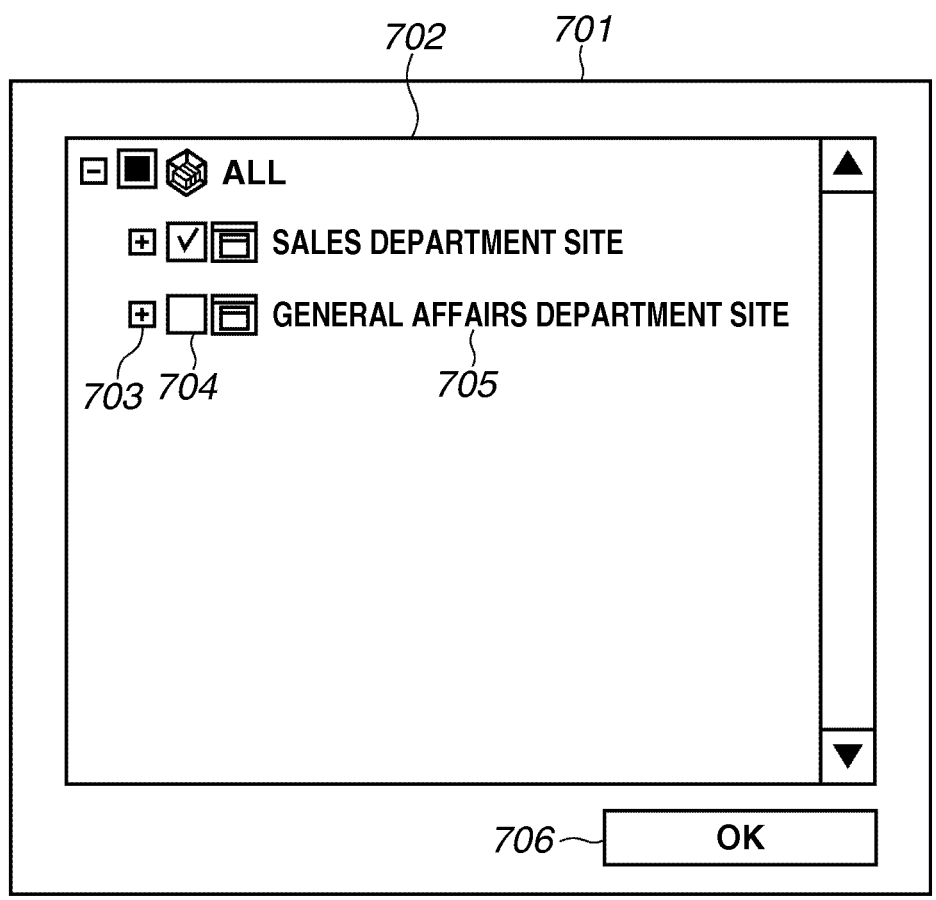
FIG. 9 is a screen for setting a search area.

A search area processing control unit 506 controls the screen of the client 102 in specifying the search area and provides the internal processing for the control. A search area setting screen 701 displayed when the search area is specified includes components 702 to 706 as illustrated in FIG. 9. The search area setting screen 701 includes the tree operation area 702 and the search area determination button 706, and data displayed in the tree operation area 702 is provided from the tree information 301 of the document management server 101.

The tree operation area 702 displays each hierarchy (site and library) of the tree information 301 as the logical hierarchy structure. In each hierarchy displayed in the tree operation area 702, the lower hierarchy expansion button 703, the search area selection check box 704, and the hierarchy name 705 are displayed.

The lower hierarchy expansion button 703 switches "expansion displaying/not displaying" of the hierarchies below the pressed hierarchy each time the button 703 is pressed by the user. The button displays "−" (minus) when the expansion is displayed and "+" (plus) when the expansion is not displayed, and the "−" and "+" are switched each time the button is pressed.

The search area selection check box 704 switches "including/not including" of the pressed hierarchy in the search area each time the check box 704 is pressed. The checked check box indicates a state where the hierarchy is selected as the search area. When the hierarchy having the lower hierarchy is checked, all the lower hierarchies than the checked hierarchy enter the checked state. Further, when the check of the hierarchy is removed, the checks are removed from all the lower hierarchies than the hierarchy from which the check has been removed.

The hierarchy name 705 displays information about the hierarchy name 412 of each hierarchy so that the user can identify each hierarchy.

When the search area determination button 706 is pressed, the hierarchy having the search area selection check box 704 checked is determined as the search area. The information about the hierarchy determined as the search area is displayed in the search area 603 in the search processing screen 601 illustrated in FIG. 8.

The index definition narrowing down processing control unit 507 controls the screen of the client 102 when an acquisition source of the index definition (index type) to be displayed in the index definition list 607 illustrated in FIG. 8 is specified and provides the internal processing for the acquisition. An screen 801 for setting the index definition narrowing down area displayed when the site and the library, from which the index definition is acquired, is narrowed down includes components 802 to 807 as illustrated in FIG. 10.

The screen 801 for setting the index definition narrowing down area includes the tree operation area 802, the index definition list 806 defined for the selection area (the site and library in process of selecting in the tree operation area 802), and the button 807 for determining the index definition narrowing down area. Data displayed in the tree operation area 802 and the index definition list 806 is provided based on the tree information 301 and the index definition information 302 stored in the document management server 101.

For each hierarchy displayed in the tree operation area 802, the lower hierarchy expansion button 803, the check box 804 for selecting an index definition narrowing down area, and the hierarchy name 805 are displayed. The lower hierarchy expansion button 803 and the hierarchy name 805 have similar functions as those of the lower hierarchy expansion button 703 and the hierarchy name 705 respectively described with reference to FIG. 9.

The check box 804 for selecting the index definition narrowing down area has the similar display and operation on the screen to those of the search area selection check box 704. However, a function is further added to the check box 804 for updating the display of the index definition list 806, when the check box 804 for selecting the index definition narrowing down area is operated (in other words, the desired hierarchy is selected or the selection is canceled).

When the check box 804 for selecting the index definition narrowing down area is checked, the index definition information (information about the index type (item name)) defined for the libraries lower than the hierarchy is acquired and displayed in the index definition list 806. Further, on the other hand, when the check is removed from the check box 804 for selecting the index definition narrowing down area, the index definition information defined for the libraries lower than the hierarchy is deleted from the index definition list 806.

The index definition list 806 is an area where the names 422 of the index definitions defined for the selected area (library in process of selection) in the tree operation area 802 are displayed in a list. When a plurality of index definition names having the same name is defined for the selected area (library selected as the definition narrowing down area), control is performed not to redundantly display the index definition names having the same name. Therefore, even if the selection of one of the check boxes is cancelled in the tree operation area 802, when the index definition having the same name is included in another selection area, the index definition is not deleted from the index definition list 806.

When the user presses the button 807 for determining index definition narrowing down area, the hierarchy checked in the check box 804 for selecting the index definition narrowing down area is determined as the hierarchy to be the acquisition target of the index definition. The index definition defined for the determined hierarchy (selection area) is set in the index definition list 607 on the search processing screen 601 described above.

When, after the desired index definition is once selected in the index definition list 607, the index definition narrowing down area is changed, even if the index definition once selected is deleted from the index definition list 607, until changing the index definition in the index definition list 607 is instructed again, the above-described index definition once selected is kept selected.

The screen display unit 508 controls the entire screen of the client, reflects the processing content performed by each of other control units to the screen, and notifies the user of user's operation content performed on the screen. The network communication unit 509 serves as the NC 207 of the client 102 and is connected with the network 103. Each processing unit requests the processing from the document management server 101 via the network communication unit 509, and receives the processing result from the document management server.

<Description of Processing>

Figure 11:
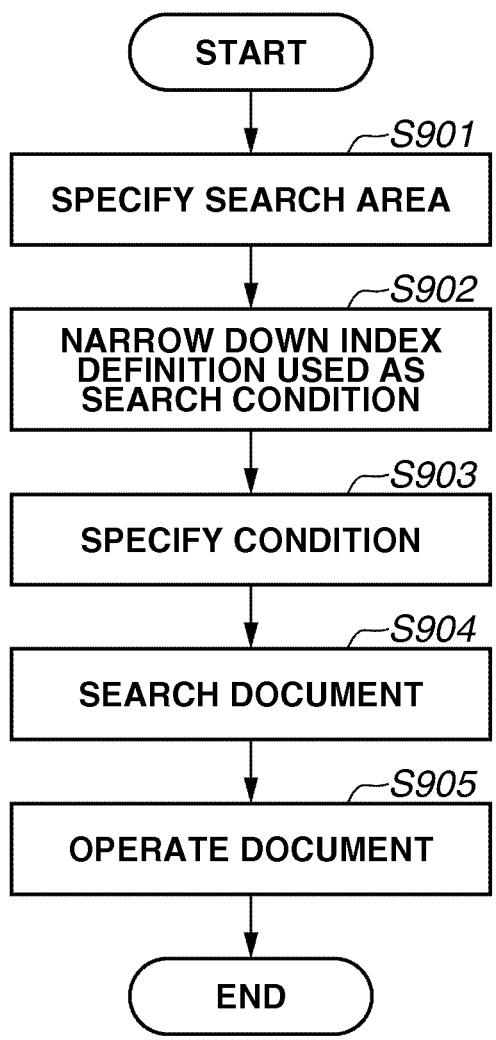
FIG. 11 illustrates a sequence of search processing according to first exemplary embodiment.

FIG. 11 illustrates a procedure performed at a client side when the search processing is performed using the search processing screen 601 displayed on the display 209 of the client 102. When this procedure is started, the search processing screen 601 illustrated in FIG. 8 is displayed.

Figure 12:
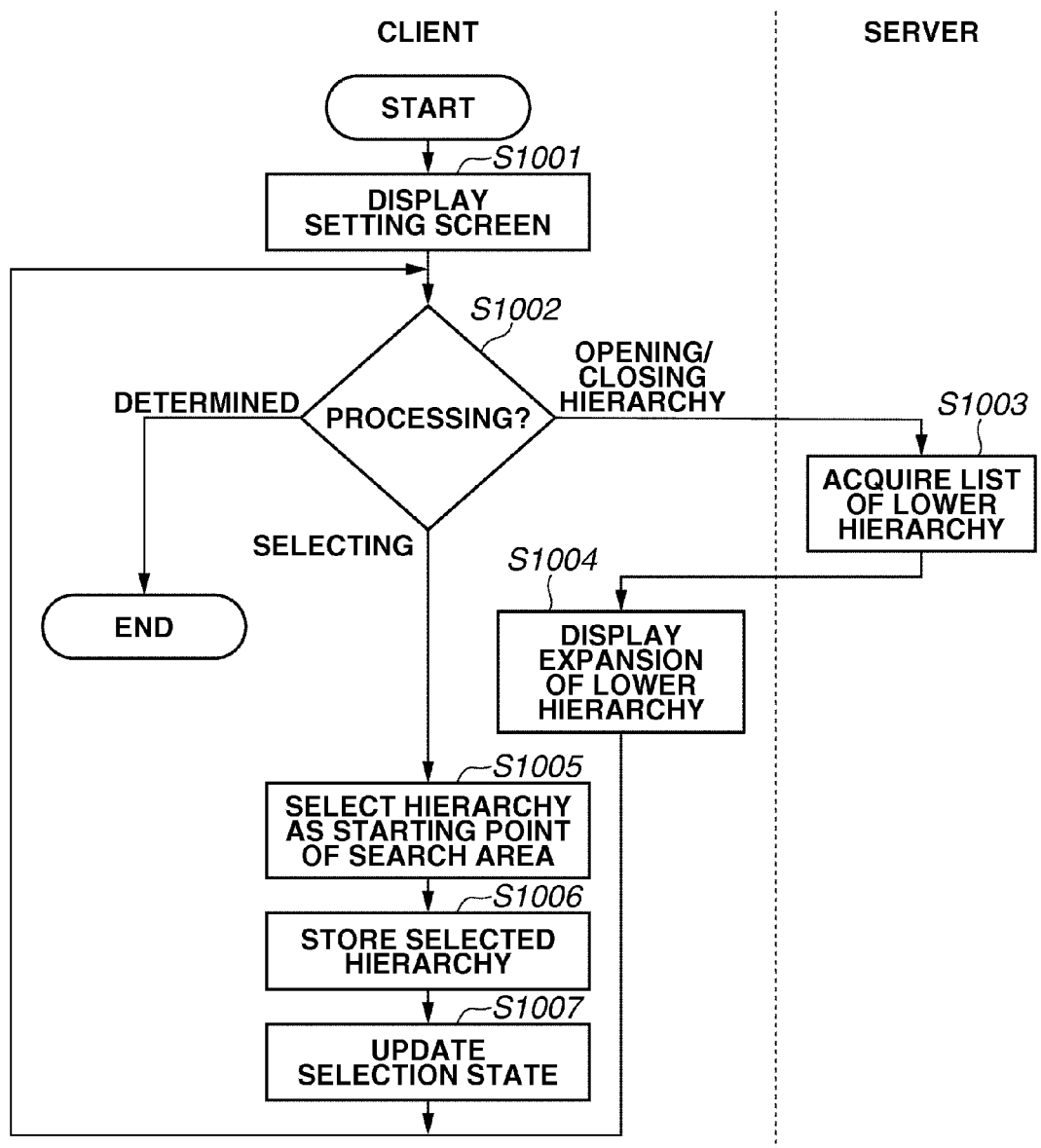
FIG. 12 is a flowchart illustrating a flow of search area setting processing according to the first exemplary embodiment.

In step S901, by using the search area setting screen 701 illustrated in FIG. 9 which is displayed in response to pressing of the search area selection button 604, the search target area of the library (or site) is set. With reference to FIG. 12, a flow of step S901 will be described below in detail. As an initial state when the search processing screen is activated, the system can also be set such that the predetermined area (e.g., all libraries) are selected as the search target area, and in such a case, this step can be omitted.

Figure 10:
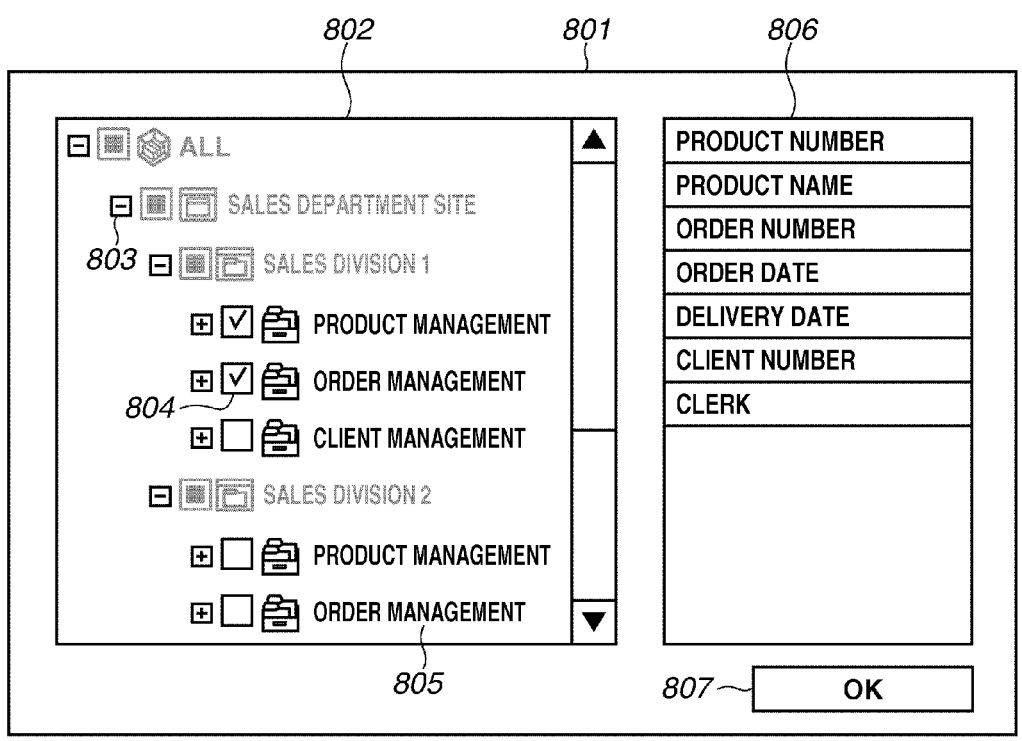
FIG. 10 is a screen for setting an index definition narrowing down area.
Figure 13:
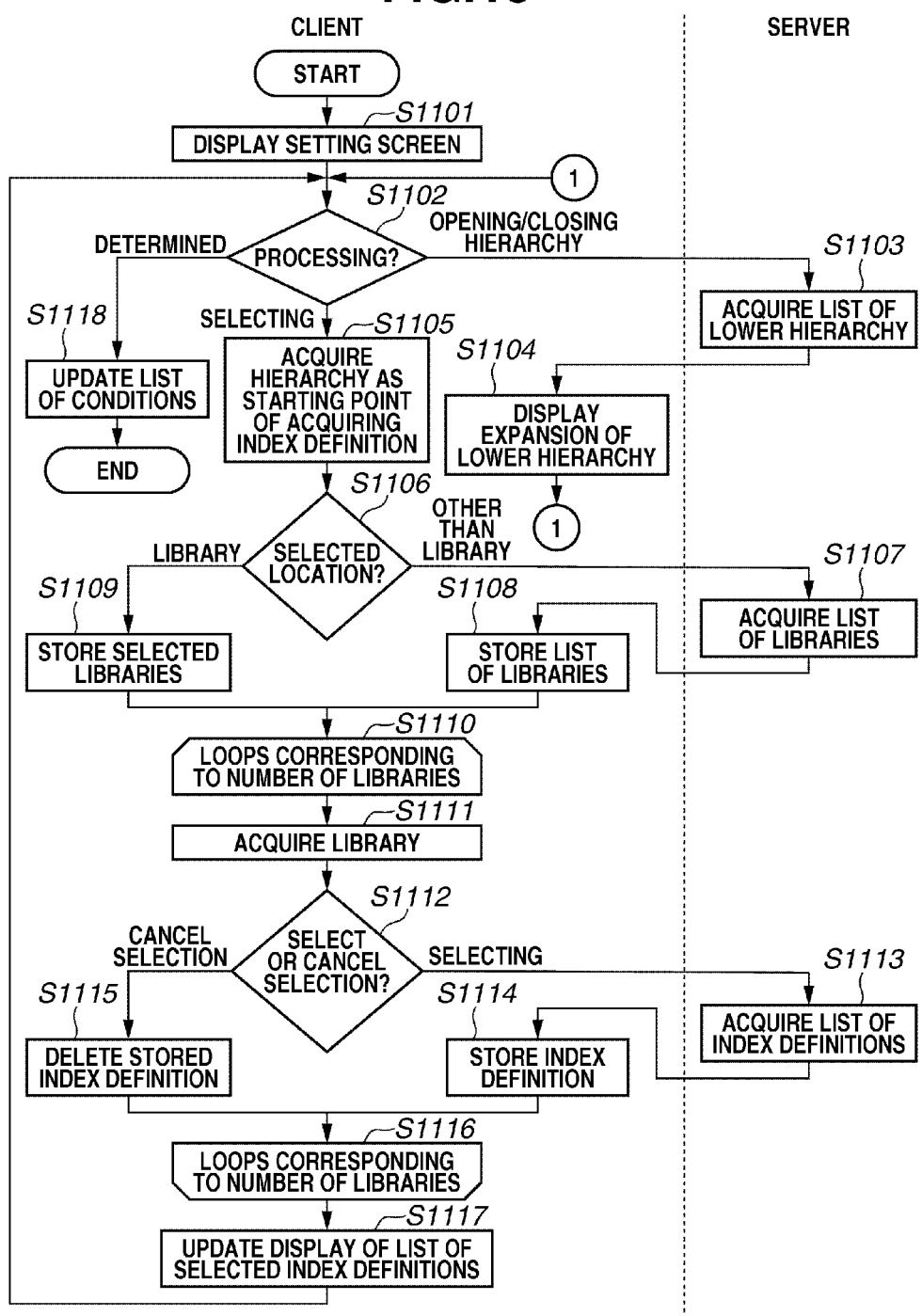
FIG. 13 is a flowchart illustrating a flow of setting processing for narrowing down an index acquisition area according to the first exemplary embodiment.

In step S902, by using the screen 801 for setting the index definition narrowing down area illustrated in FIG. 10 which is displayed in response to pressing of the button 605 for selecting the index definition narrowing down area, a library area is specified that is an acquisition target of the index definition which is displayed as a list in the index definition list 607. With reference to FIG. 13, a flow of step S902 will be described below in detail.

In step S903, the user specifies the search condition via the conditional expression setting area 606 illustrated in FIG. 8. In step S903, on the screen of the client 102, the user sets each of the index definition list 607, the condition value 608, and the condition operator 609 as described above.

Figure 14:
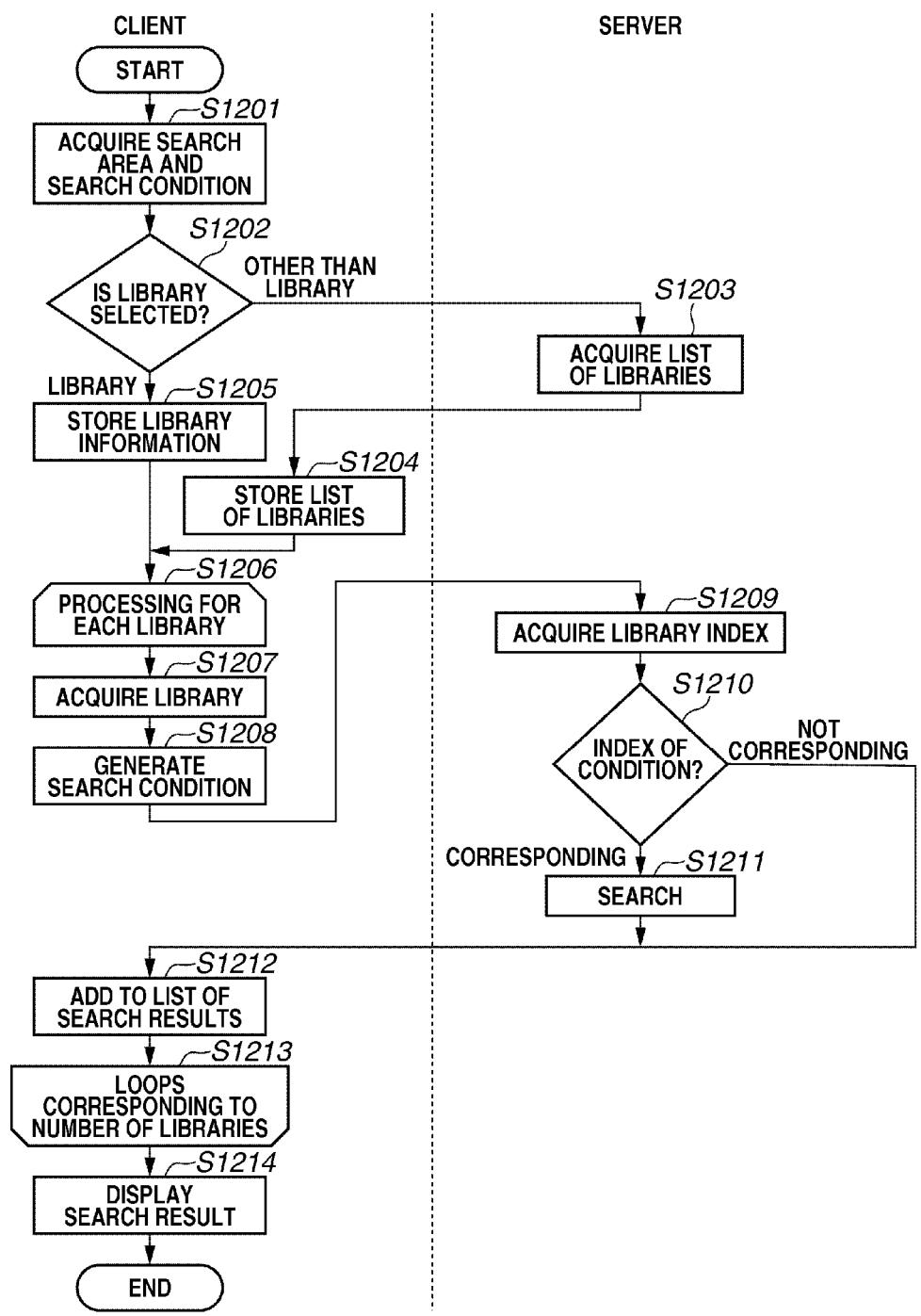
FIG. 14 is a flowchart illustrating a flow of the search processing according to the first exemplary embodiment.

When the search condition is determined in steps S901, S902, and S903, then in step S904, document search processing is performed. With reference to FIG. 14, a flow of the document search processing will be described below in detail. As a result of performing the search processing, the document corresponding to the search condition is displayed in the search result display area 611 illustrated in FIG. 8.

In step S905, on at least any one of the documents selected by the user from among the documents displayed in the search result display area 611, arbitrary processing (e.g., downloading, deleting, and index changing) specified by the user is performed.

The procedures of steps S901, S902, and S903 indicate the search performed once, and when the search condition is changed to perform another search, the condition may be set again for only necessary steps to perform another search.

<Search Area Setting Processing>

With reference to FIG. 12, search area setting processing in step S901 will be described in detail. FIG. 12 illustrates a processing flow performed in response to pressing of the search area selection button 604 by the user. If not otherwise described, the processing is performed by the search area processing control unit 506 of the client 102.

In step S1001, the search area setting screen 701 is displayed in response to pressing of the search area selection button 604. In an initial display state, only "all" is displayed on a top of the screen.

In step S1002, in the search area setting screen 701, it is determined what instruction the user has given. When it is determined that the lower hierarchy expansion button 703 is pressed, to acquire the hierarchy information necessary for an opening/closing operation of the hierarchy from the document management server 101, the hierarchy ID 411 to which the expansion instruction has been given is specified, and then the processing proceeds to step S1003. Further, when it is determined that the search area selection check box 704 is pressed, the processing proceeds to step S1005. Furthermore, when it is determined that the search area determination button 706 is pressed, the information added to the RAM 202 is deleted, and the setting screen is closed to end the processing.

The processing in step S1003 is performed by the tree processing control unit 307 of the document management server 101. The tree processing control unit 307 acquires the hierarchy information including the upper hierarchy ID 413 corresponding to the hierarchy ID 411 specified by the client 102 via the tree information management unit 304, from among the tree information 301 and transmits the hierarchy information to the client 102. In other words, the information about the hierarchy lower than the hierarchy ID specified by the client is acquired and transmitted.

In step S1004, the hierarchy information about the tree information 301 transmitted from the document management server 101 is displayed in the tree operation area 702. More specifically, below the lower hierarchy expansion button 703 pressed in step S1002, the hierarchy information about the lower hierarchy is inserted with one hierarchy indented to the right. When the processing is ended, the processing returns to step S1002.

In step S1005, the hierarchy information corresponding to the search area selection check box 704 that is determined to have been pressed in step S1002, and a state after clicking (either of on and off) are acquired, and then stored in the RAM 202.

In step S1006, based on the information stored in the RAM 202 in step S1005, processing described below will be performed. When the state after clicking is "on (in other words, a state where the hierarchy is included in the search area)", by using the search area information management unit 502, the hierarchy information is stored in the search area information 501. On the other hand, the state after clicking is "off (in other words, a state where the hierarchy is not included in the search area)", by using the search area information management unit 502, the hierarchy information is deleted from the search area information 501.

In step S1007, a selection state of the search area selection check box 704 on the screen is updated to display "checked state" when the state is on, and to display "not checked state" when the state is off. When the processing in step S1007 is ended, the processing returns to step S1002.

<Index Definition Narrowing Down Processing>

With reference to FIG. 13, index definition narrowing down processing in step S902 will be described in detail. FIG. 13 illustrates a processing flow performed in response to pressing of the button 605 for selecting the index definition narrowing down area on the search processing screen 601 by the user. If not otherwise described, the processing is performed by the index definition narrowing down processing control unit 507 of the client 102.

In step S1101, in response to pressing of the button 605 for selecting the index definition narrowing down area, the screen 801 for setting the index definition narrowing down area is displayed. In the initial display state, only "all" is displayed on the top of the screen.

In step S1102, in the screen 801 for setting the index definition narrowing down area, it is determined what instruction the user has given. When it is determined that the lower hierarchy expansion button 803 is pressed, to acquire the hierarchy information necessary for the opening/closing operation of the hierarchy from the document management server 101, the hierarchy ID 411 to which the expansion instruction has been given is specified, and then the processing proceeds to step S1103. Further, when it is determined that the check box for selecting the index definition narrowing down area 804 is pressed, the processing proceeds to step S1105. Furthermore, when it is determined that the button for determining the index definition narrowing down area 807 is pressed, the processing proceeds to step S1118.

The processing in step S1103 is performed by the tree processing control unit 307 of the document management server 101. The tree processing control unit 307 acquires the hierarchy information including the upper hierarchy ID 413 corresponding to the hierarchy ID 411 specified by the client 102 via the tree information management unit 304, from among the tree information 301, and transmits the hierarchy information to the client 102. In other words, the information about the hierarchy lower than the hierarchy ID specified by the client is acquired and transmitted.

In step S1104, the hierarchy information about the tree information 301 transmitted from the document management server 101 is displayed in the tree operation area 802. More specifically, below a line of the lower hierarchy expansion button 803 pressed in step S1102, the hierarchy information about the lower hierarchy is inserted with one hierarchy indented to the right. When the processing is ended, the processing returns to step S1102.

In step S1105, the information about the hierarchy corresponding to the check box for selecting the index definition narrowing down area 804 that is determined to have been pressed in step S1002, and a state after clicking (on/off) are acquired and then stored in the RAM 202.

In step S1106, it is determined whether the type 414 of the hierarchy information stored in the RAM 202 is the library or any other type ("site" according to the present exemplary embodiment"), and then the processing proceeds to following processing respectively. When the type 414 is the "library", the processing proceeds to step S1109, and then the selected hierarchy information is stored in the RAM 202. On the other hand, when the type 414 is "any type other than the library", to acquire the information about the library hierarchy located lower than the specified hierarchy from the document management server 101, the hierarchy ID 411 to be a starting point is specified, and then the processing proceeds to step S1107.

The processing in step S1107 is performed by the tree processing control unit 307 of the document management server 101. The tree processing control unit 307 acquires the hierarchy information including the upper hierarchy ID 413 corresponding to the hierarchy ID 411 specified by the client 102 via the tree information management unit 304, from among the tree information 301, and confirms whether the acquired type 414 of the hierarchy information is the "library". When the type 414 is not the "library", processing for acquiring the information about the lower hierarchy is further repeated until the types 414 of all acquired hierarchy information indicate the "library".

When the all hierarchy information about the lower hierarchy in which the type 414 is the "library" is acquired, all information is transmitted to the client 102. In step S1108, the hierarchy information transmitted from the document management server 101 is stored in the RAM 202.

Step S1110 is a starting point of loop processing which is performed the number of times corresponding to the number of pieces of the hierarchy information stored in the RAM 202. The processing in steps S1110 to S1116 is sequentially performed on each hierarchy information stored in the RAM 202.

In step S1111, one piece of hierarchy information that has not been processed and stored in the RAM 202 is acquired.

In step S1112, the state of the check box for selecting the index definition narrowing down area 804 acquired in step S1105 after clicking is confirmed. When it is an "on" state (selected state), the processing proceeds to step S1113, and when it is an "off" state (not selected state), the processing proceeds to step S1115.

Processing in step S1113 is performed by the index processing control unit 308 of the document management server 101. The index processing control unit 308 acquires the information about the index definition including the library ID 424 corresponding to the hierarchy ID 411 specified by the client 102 via the index definition information management unit 305 and transmits the hierarchy information to the client 102. In step S1114, the information about the index definition transmitted from the document management server 101 is stored in the index definition area information 503 using the index definition area information management unit 504.

In step S1115, by using the index definition area information management unit 504, among the information about the index definition stored in the index definition area information 503, the information about the index definition including the library ID 424 corresponding to the hierarchy ID 411 included in the hierarchy information acquired in step S1111 is deleted.

In step S1116, which is an ending point of the loop paired with step S1110, the hierarchy information acquired in step S1111 is deleted from the RAM 202. When the hierarchy information that has not been processed remains, the processing returns to step S1110.

In step S1117, in the index definition list 806 on the screen 801 for setting the index definition narrowing down area, names 422 (index types) of the index definitions defined for the selected libraries are displayed. With respect to the name of the index definition displayed in the index definition list 806, all information about the index definition stored in the index definition area information 503 is acquired and used. At this point, when the index definition information having the same name is included, the overlapped name is not displayed.

In step S1118, the list is updated so that the index definition name 422 displayed in the index definition list 806 can be selected in the index definition list 607 on the search processing screen 601.

<Document Search Processing>

With reference to FIG. 14, the document search processing in step S904 will be described in detail. FIG. 14 illustrates a flow of processing performed in response to pressing of the search execution button 610 on the search processing screen 601 by the user. If not otherwise described, the processing is performed by the search processing control unit 505 of the client 102.

In step S1201, the information about the search conditions set in the search area 603 and the conditional expression setting area 606 input/set by the user is acquired. For the search area 603, the hierarchy information stored in the search area information 501 is acquired from the search area information management unit 502. All acquired search condition information is stored in the RAM 202.

In step S1202, it is determined whether the type 414 of the tree information 301 selected in the search area is the library or any other type ("site" according to the present exemplary embodiment), and then the processing proceeds to following processing respectively.

When the type 414 is the "library", the processing proceeds to step S1205, and the selected hierarchy information is stored in the RAM 202.

When the type 414 is "any type other than the library", to acquire the information about the library hierarchy located lower than the specified hierarchy, from the document management server 101, the hierarchy ID 411 to be a starting point is specified, and then the processing proceeds to step S1203.

The processing in step S1203 is performed by the tree processing control unit 307 of the document management server 101. The tree processing control unit 307 acquires the hierarchy information including the upper hierarchy ID 413 corresponding to the hierarchy ID 411 specified by the client 102 via the tree information management unit 304 from the tree information 301, and confirms whether the acquired type 414 is the "library". When the type 414 is not the "library", the processing for acquiring the information about the lower hierarchy is further repeated until the types 414 of all acquired hierarchy information indicate the "library". When all hierarchy information about the lower hierarchy in which the type 414 is the "library" is acquired, all information is transmitted to the client 102. In step S1204, the hierarchy information transmitted from the document management server 101 is stored in the RAM 202.

Step S1206 is a starting point of the loop processing performed the number of times corresponding to the number of pieces of the hierarchy information stored in the RAM 202. The processing in steps S1206 to S1213 is sequentially performed on each hierarchy information stored in the RAM 202.

In step S1207, one piece of the hierarchy information that has not been processed and is stored in the RAM 202 is acquired.

In step S1208, by using the search condition information stored in RAM 202 in step S1201, the search condition data is generated, and the generated search condition data and the hierarchy information acquired in step S1207 are transmitted to the search processing unit 309 of the document management server 101. The search condition data to be transmitted is generated by converting, based on the search condition information, the values (options) in the index definition list 607, the condition value 608, and the condition operator 609 into tag information in an extensible makeup language (XML) format that can be used to perform the search. The generated XML will be in the format described below.

<Query>
<Field>{selected name in index definition list 607}</Field>
<Value Type="TEXT">{input value of condition value 608}</Value>
<Relation Type="{selection operator of condition operator 609}"></Relation>
</Query>

The processing in steps S1209 to S1211 is performed by the search processing unit 309 of the document management server 101.

In step S1209, the information about the index definition including the library ID 424 corresponding to the hierarchy ID 411 included in the hierarchy information transmitted from the client 102 is acquired from the index definition information 302 managed by the index definition information management unit 305, and stored in the RAM 202 of the document management server.

In step S1210, it is confirmed whether the index definition information corresponding to the search condition XML specified by the client is included in the index definition information 302 stored in step S1209. What is confirmed is two points, which are (1) whether the name described in a <field> tag corresponds to the index definition name 422 of the index definition information 302, and (2) whether the type described in a type attribute of a <value> tag corresponds to the type 423 of the index definition information 302.

When the corresponding index definition information 302 is included, the <field> tag received from the client 102 is corrected as below, and the processing proceeds to step S1211.

<Field Id="{index definition ID 421 of index definition information 302}">{selection name in index definition list 607}</Field>

On the other hand, when the corresponding index definition information 302 is not included, the processing proceeds to step S1212.

In step S1211, the search processing is performed using the document information management unit 306. More specifically, among the documents belonging to the library of the hierarchy ID included in the hierarchy information received from the client 102, the document information 303 in which the index information corresponding to the corrected XML condition is set is acquired and transmitted to the client 102.

In step S1212, all the document information 303 acquired from the search processing unit 309 of the document management server 101 is additionally stored in the RAM 202.

In step S1213, which is the ending point of the loop paired with step S1206, the hierarchy information acquired in step S1207 is deleted from the RAM 202. When the hierarchy information that has not been processed remains, the processing returns to step S1206.

In step S1214, all document information 303 stored in the RAM 202 is acquired and displayed in the search result display area 611. According to the present exemplary embodiment, since the document name is to be displayed, the document name 432 in the document information 303 is displayed.

A configuration of a system according to a second exemplary embodiment of the present invention, and a flow of processing will be described below, with reference to FIGS. 15 and 16. According to the second exemplary embodiment, acquisition timing of the index used to specify the condition is different from that according to the first exemplary embodiment. Features extended from the first exemplary embodiment are FIGS. 11 and 14 of the first exemplary embodiment. Other features are not repeatedly described since they are similar to the first exemplary embodiment.

<Description of Processing>

Figure 15:
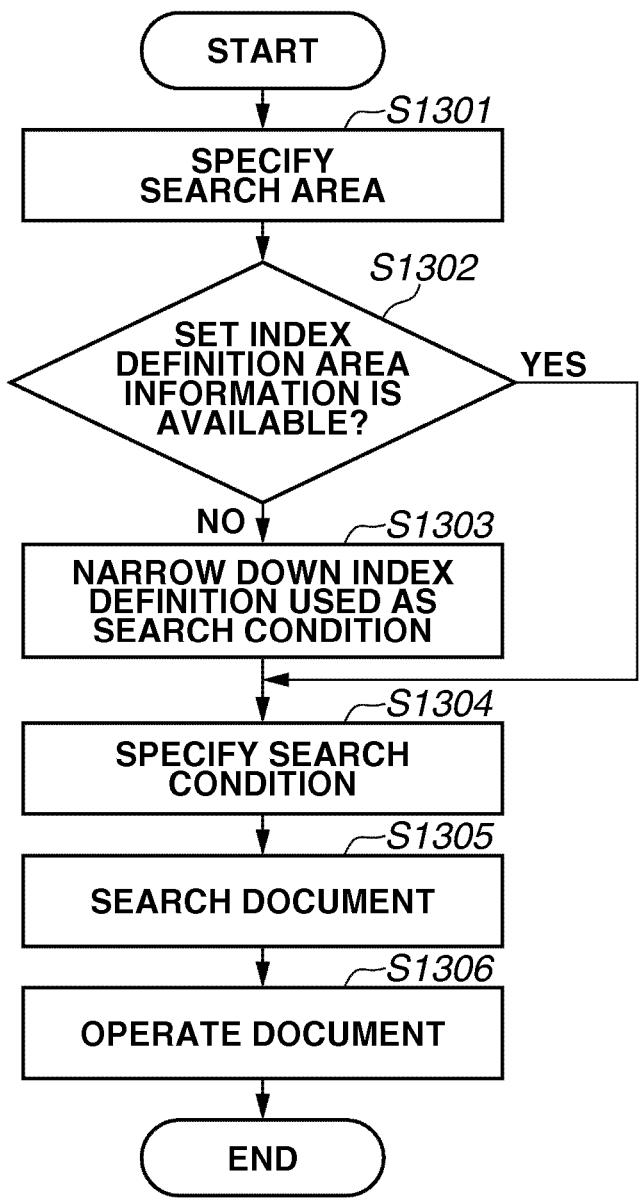
FIG. 15 illustrates a main sequence of search processing according to a second exemplary embodiment.

FIG. 15 illustrates a procedure at a client side when the search processing is performed using the search processing screen 601 according to the second exemplary embodiment. When the procedure is started, the search processing screen 601 is displayed.

Each processing of steps S1301, and S1303 to S1306 illustrated in FIG. 15 is similar to that in steps S901 to S905 illustrated in FIG. 11 of the first exemplary embodiment, and thus only different processing in step S1302 will be described.

Step S1302 is performed after specification of the search area is finished in step S1301. In step S1302, it is determined whether the index definition area information management unit 504 includes the index definition area information 503 that has been already set (index definition information already acquired from the server). When the index definition area information management unit 504 includes the index definition area information 503, the information is acquired and step S1303 is skipped, and the processing proceeds to step S1304.

On the other hand, when the index definition area information management unit 504 does not include the index definition area information 503, similar to the first exemplary embodiment, in step S1303, the narrow down processing of the index definition area is performed.

<Document Search Processing>

FIG. 16 illustrates a flow of processing performed when the search execution button 610 on the search processing screen 601 is pressed according to the second exemplary embodiment.

Each processing of steps S1401 to S1412, S1415, and S1416 illustrated in FIG. 16 is similar to that of steps S1201 to S1214 described with reference to FIG. 14 in the first exemplary embodiment, and thus only different processing in steps S1413 and S1414 will be described.

Steps S1413 is performed after the search result in a library unit is stored in the RAM 202 in step S1412. The processing in step S1413 is performed using the index processing control unit 308 of the document management server 101. In step S1413, the hierarchy ID 411 being processed is received from the client 102, and the index definition information 302 including the library ID 424 corresponding to the hierarchy ID 411 is acquired from the index definition information management unit 305 and transmitted to the client 102.

In step S1414, the index definition area information 503 including the library ID 424 corresponding to the hierarchy ID 411 of the library being processed is searched and collectively deleted via the index definition area information management unit 504. Subsequently, the information included in the index definition information 302 transmitted from the document management server 101 in step S1413 is stored in the index definition area information 503 using the index definition area information management unit 504. With this arrangement, the area for narrowing down the index definition is updated.

A configuration of a system according to a third exemplary embodiment of the present invention and a flow of processing will be described with reference to FIG. 17. The third exemplary embodiment is different from the first exemplary embodiment in that, when in the search result, the index definition information specified as a conditional expression is not hit, if the index of a different type is set, the search is also performed with that index as related one. A feature extended from the first exemplary embodiment is illustrated in FIG. 14 of the first exemplary embodiment, and other features are not repeated since they are similar to the first exemplary embodiment.

<Document Search Processing>

FIG. 17 illustrates a processing flow performed when the search execution button 610 of the search processing screen 601 is pressed, according to the third exemplary embodiment.

Each processing of steps S1501 to S1510, and S1514 to S1517 illustrated in FIG. 17 is similar to that of steps S1201 to S1214 described with reference to FIG. 14 according to the first exemplary embodiment, and thus only the different processing in steps S1511 to S1513 will be described.

Processing in step S1511 is performed when it is determined in step S1510 that the corresponding index definition information 302 is not included.

In step S1511, it is determined whether the index definition information 302 of a different type is included. More specifically, it is confirmed whether the index definition information 302 is included that has corresponding <field> tags but does not have <value> tags which show corresponding type attributes. When it is determined that the index definition information 302 in such a state is included, the processing proceeds to step S1512. When it is not included, no search result is acquired, and then the processing proceeds to step S1515.

In step S1512, since the index information of the different types is included, following two tags of the XML for searching are changed.

<Field Id="{index definition ID 421 of index definition information 302}">{selected name of index definition list 607}</Field>

<Value Type="{type 423 of index definition information 302}"></Type>

In step S1513, based on the tag changed in step S1512, the search processing is performed using the document information management unit 306. More specifically, among the documents belonging to the library of the hierarchy ID received from the client 102, the document information 303 in which the index information corresponding to the changed XML condition is set is searched, and transmitted to the client 102.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-025334 filed Feb. 8, 2012, which is hereby incorporated by reference herein in its entirety.

What is claimed is:

1. A document management system for managing a plurality of documents, the document management system comprising at least one hardware processor which executes a computer program to function as:

a first selection unit configured to select, based on a user's instruction, a first set of libraries from a plurality of libraries as a search target, wherein the plurality of libraries are units of document management, and wherein index definitions are independently defined for each of the plurality of libraries;

a second selection unit configured to select, based on a user's instruction, a second set of libraries from a plurality of libraries as an index acquisition target to acquire index names defined for the selected second set of libraries, wherein the second set of libraries differs from the first set of libraries;

a search condition setting unit configured to display the index names acquired by the second selection unit, make a user select a desired index name from among the displayed index names, and set a search condition using the selected index name; and a search unit configured to search for a document corresponding to the search condition set by the search condition setting unit from among a plurality of documents managed by the first set of libraries selected as the search target by the first selection unit.

2. The document management system according to claim 1,
wherein the document management system is configured to classify the libraries using a plurality of sites that are hierarchically configured,
wherein, if the first selection unit specifies a desired first site as the search target based on a user's instruction, the first selection unit selects the first set of libraries belonging to a lower hierarchy of the specified first site as the search target, and
wherein, if the second selection unit specifies a desired second site as the index acquisition target based on a user's instruction, the second selection unit selects the second set of libraries belonging to the lower hierarchy of the specified second site as the index acquisition target.

3. The document management system according to claim 1, wherein the search unit is configured to transmit the search condition set by the search condition setting unit and information about the first set of libraries selected as the search target by the first selection unit, to a document management server to search for a document corresponding to the search condition.

4. The document management system according to claim 3, wherein the document management server acquires index names defined for the first set of libraries selected as the search target, and does not determine whether the document managed by a library which does not define the index name used in the search condition, corresponds to the search condition.

5. A non-transitory computer-readable storage medium storing a computer program for making a computer function as each of the units of the document management system described in claim 1.

6. A document management method performed by a document management system for managing a plurality of documents, the document management method comprising:
selecting, by a first selection unit, based on a user's instruction, a first set of libraries from a plurality of libraries as a search target, wherein the plurality of libraries are units of document management, and wherein index definitions are independently defined for each of the plurality of libraries;
selecting, by a second selection unit, based on a user's instruction, a second set of libraries from a plurality of libraries as an index acquisition target to acquire index names defined for the selected second set of libraries, wherein the second set of libraries differs from the first set of libraries;
displaying the index names acquired by the second selection unit, making a user select a desired index name from among the displayed index names, and setting a search condition using the selected index name; and searching for a document corresponding to the search condition set by the setting step from among a plurality of documents managed by the first set of libraries selected as the search target by the first selection unit.

7. The document management method according to claim 6,
classifying the libraries using a plurality of sites that are hierarchically configured,
selecting, by the first selection unit, the first set of libraries belonging to a lower hierarchy of the specified first site as the search target if the selecting, by the first selection unit, specifies a desired first site as the search target based on a user's instruction; and
selecting, by the second selection unit, the second set of libraries belonging to the lower hierarchy of the specified second site as the index acquisition target if the selecting, by the second selection unit, specifies a desired second site as the index acquisition target based on a user's instruction.

8. The document management method according to claim 6, further comprising transmitting the search condition set by the search condition setting unit and information about the first set of libraries selected as the search target by the first selection unit, to a document management server to search for a document corresponding to the search condition.

9. The document management method according to claim 8, wherein the document management server acquiring index names defined for the first set of libraries selected as the search target.

10. The non-transitory computer-readable storage medium according to claim 5,
wherein the document management system is configured to classify the libraries using a plurality of sites that are hierarchically configured,
wherein, if the first selection unit specifies a desired first site as the search target based on a user's instruction, the first selection unit selects the first set of libraries belonging to a lower hierarchy of the specified first site as the search target, and
wherein, if the second selection unit specifies a desired second site as the index acquisition target based on a user's instruction, the second selection unit selects the second set of libraries belonging to the lower hierarchy of the specified second site as the index acquisition target.

11. The non-transitory computer-readable storage medium according to claim 5, wherein the search unit is configured to transmit the search condition set by the search condition setting unit and information about the first set of libraries selected as the search target by the first selection unit, to a document management server to search for a document corresponding to the search condition.

12. The non-transitory computer-readable storage medium according to claim 11, wherein the document management server acquires index names defined for the first set of libraries selected as the search target, and does not determine whether the document managed by a library which does not define the index name used in the search condition, corresponds to the search condition.

* * * * *